(12) United States Patent
Boddy et al.

(10) Patent No.: US 6,497,491 B2
(45) Date of Patent: Dec. 24, 2002

(54) EXTENDABLE MIRROR

(75) Inventors: Ian Boddy, Ada, MI (US); Kenneth Peterson, Comstock Park, MI (US)

(73) Assignee: Magna Mirror Systems Inc., Alto, MI (US)

( * ) Notice: Subject to any disclaimer, the term of this patent is extended or adjusted under 35 U.S.C. 154(b) by 0 days.

(21) Appl. No.: 09/922,443

(22) Filed: Aug. 3, 2001

(65) Prior Publication Data

US 2002/0048095 A1 Apr. 25, 2002

Related U.S. Application Data

(60) Provisional application No. 60/223,293, filed on Aug. 3, 2000.

(51) Int. Cl.[7] .............................................. G02B 5/08
(52) U.S. Cl. ..................... 359/841; 359/842; 359/843; 359/838
(58) Field of Search ........................ 359/841, 842, 359/843, 872, 873, 877, 881, 838; 362/83.1; 340/426, 447, 475, 478, 825.72

(56) References Cited

U.S. PATENT DOCUMENTS

| | | | |
|---|---|---|---|
| 5,303,205 A | 4/1994 | Gauthier et al. ............ 367/108 |
| 5,587,699 A | * 12/1996 | Faloon et al. ................ 116/202 |
| 5,624,176 A | * 4/1997 | O'Farrell et al. ........... 340/456 |
| 5,774,283 A | * 6/1998 | Nagel et al. ................. 340/426 |
| 5,864,438 A | 1/1999 | Pace .......................... 359/841 |
| 5,878,353 A | 3/1999 | ul Azam et al. ............ 455/550 |
| 6,005,724 A | * 12/1999 | Todd ........................... 359/883 |
| 6,019,475 A | 2/2000 | Lynam et al. ............... 359/879 |
| 6,039,448 A | 3/2000 | Oprea ......................... 359/850 |
| 6,047,271 A | 4/2000 | Chu ............................ 340/463 |
| 6,099,154 A | 8/2000 | Olney ......................... 362/494 |
| 6,116,743 A | 9/2000 | Hock .......................... 359/871 |
| 6,158,655 A | 12/2000 | DeVries, Jr. et al. ........ 235/380 |
| 6,167,255 A | 12/2000 | Kennedy, III et al. ...... 455/414 |
| 6,176,602 B1 | 1/2001 | Pastrick et al. ............. 362/494 |
| 6,179,428 B1 | 1/2001 | Krass .......................... 359/841 |
| 6,198,409 B1 | 3/2001 | Schofield et al. ........... 340/903 |
| 6,213,609 B1 | 4/2001 | Foote et al. ................. 359/841 |

* cited by examiner

*Primary Examiner*—Mohammad Sikder
(74) *Attorney, Agent, or Firm*—Clark Hill PLC

(57) ABSTRACT

An exterior rearview mirror assembly for use on an automotive vehicle comprises a base member having a mounting plate for fixedly securing the mirror assembly to the side of the vehicle and a base plate extending outwardly therefrom. An elongated support arm has a first end pivotally coupled to the base plate and an opposite second end supporting a concave mirror housing. The mirror housing includes a peripheral rim defining an opening for receiving a reflective glass mirror pane. The mirror pane includes a directional indicator for providing directional signaling of the intended vehicle path. The mirror assembly further includes a puddle lamp for illuminating areas adjacent to the vehicle for entry and exit and for signaling rearward of the vehicle. Finally, the mirror assembly includes a display panel operatively connected to the vehicle for displaying information indicative of the vehicles operating conditions.

7 Claims, 4 Drawing Sheets

EXTENDABLE MIRROR

This application claims the benefit of Provisional Application No. 60/223,293, filed Aug. 3, 2000.

BACKGROUND OF THE INVENTION

1. Field of Invention

The subject invention relates to an extendable and rotatable exterior rearview mirror assembly having signal and safety lights and an operator display panel.

2. Description of the Relate Art

Automotive vehicles typically include an exterior rearview mirror assembly secured to both the driver's side door and passenger's side door of the vehicle for viewing objects to the side and rear of the vehicle. It is known to provide exterior rearview mirrors which are extendable between a retracted position adjacent the side of the vehicle and an extended position spaced from the side of the vehicle for increased rearward vision, such as for use when towing a secondary vehicle. It is also known to provide exterior rearview mirror which are pivotal or rotatable between an extended use position for rearward viewing by the operator of the vehicle and a folded position, rotated inwardly against the side of the vehicle for storage to prevent contact and damage by objects adjacent the side of the vehicle. Signaling lights and safety lights are also common in exterior rearview mirrors for illuminating directional signals or areas adjacent the vehicle during entry and exit of the vehicle.

However, it is not known to combine each of these components, or features, of exterior rearview mirrors into one mirror assembly. Furthermore, it is desirable to provide an operator display panel in the mirror assembly which is viewable by the operator of the vehicle for displaying vehicle information such as navigation information, tire pressure, presence and position of a towed secondary vehicle, outside temperature, distance for objects adjacent the vehicle, etc.

It is also desirable to provide a signal light with is activated when the mirror is in the extended position to warn oncoming vehicles or pedestrian of an approaching towing vehicle.

SUMMARY OF THE INVENTION

According to one aspect of the invention there is provided an exterior rearview mirror assembly for use in an automotive vehicle comprising a base member adapted to fixedly secure said mirror assembly to the vehicle. An elongate support arm extends from a first end coupled to the base member and a second end spaced from the base member. A concave mirror housing is slidably coupled to the support arm for movement between a retracted position adjacent the base member and an extended position spaced outwardly from the base member. The housing having a peripheral rim defining an opening into the concave housing. A light assembly is mounted to the mirror housing opposite the peripheral rim for providing a forward facing lighted illumination from the mirror assembly to alert oncoming occupants of the vehicle.

According to another aspect of the invention, there is provided an exterior rearview mirror assembly for use in an automotive vehicle comprising a base member adapted to fixedly secure the mirror assembly to the vehicle. The mirror including an elongate support arm extending from a first end pivotally coupled to the base member and a second end spaced from the base member. A concave mirror housing is rotatably coupled to the second end of the support arm. The housing has a peripheral rim defining an opening into the concave housing. A glass mirror pane is seated within the opening and pivotally secured to the housing. A display panel is coupled to the support arm for displaying information indicative of the vehicles operating conditions.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
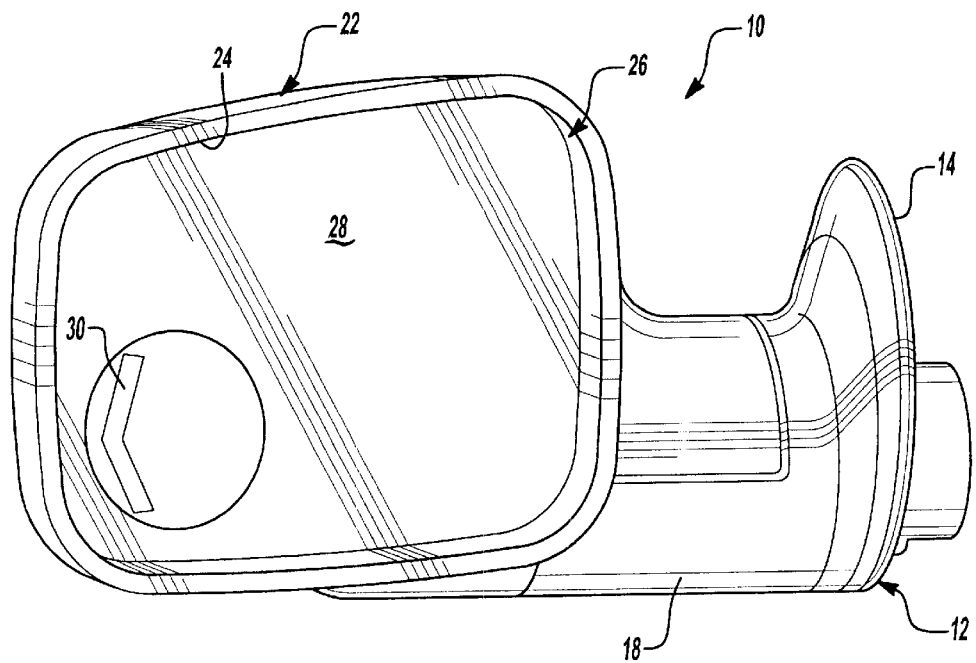
FIG. 1 is a front view of the mirror assembly according to the preferred embodiment in the retracted position.
Figure 2:
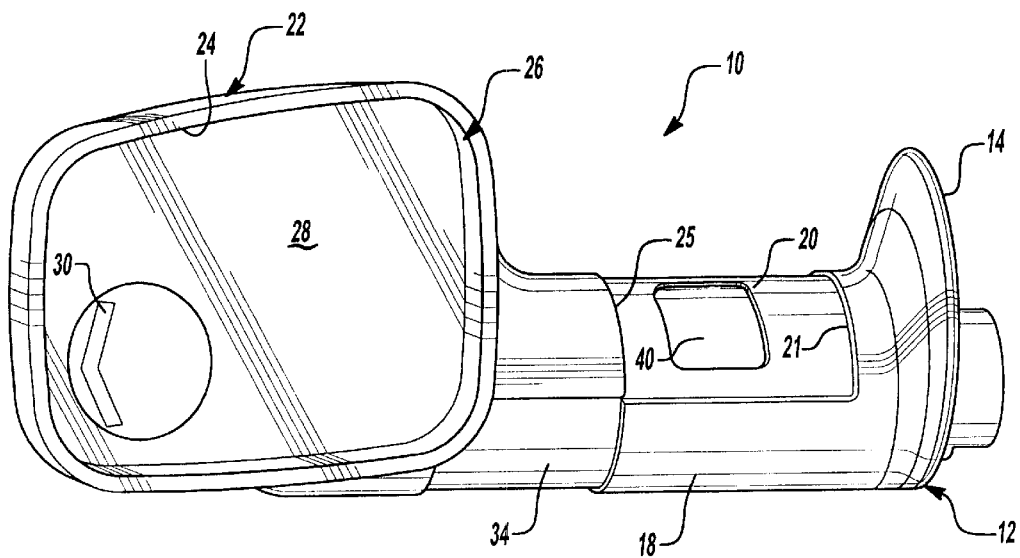
FIG. 2 is a front view of the mirror assembly in the extended position.

Referring to FIG. 1, an exterior rearview mirror assembly is shown at 10 for use on an automotive vehicle. The mirror assembly 10 includes a base member 12 for securing the assembly 10 to the vehicle. The base member 12 includes a planar mounting plate 14 adapted to fixedly secure the mirror assembly 10 to one of the sides of the vehicle, such as the driver or passenger side door or side panel. The base member 12 further includes a base plate 18 extending outwardly and generally perpendicular from the mounting plate 14. Referring also to FIG. 2, the mirror assembly 10 includes an elongated support arm 20 having a first end 21 pivotally secured to the base plate 18 and an opposite second end 23 coupled to and supporting a concave mirror housing 22. The mirror housing 22 has a peripheral rim 24 defining an opening 26 into the concave mirror housing 22. A glass mirror pane 28 is seated within the opening 26 and pivotally secured to the mirror housing 22 by a pivot mechanism (not shown, but commonly known to one skilled in the art) for pivoting the pane 28 relative to the housing 22 and providing a reflective view to the occupant of the vehicle.

A directional indicator 30, such as a patterned light assembly, is attached to the mirror pane 28 for providing a directional signal operable in response to the activation of a vehicle directional signal control for providing a rearwardly projecting illuminated signal indicative of the intended vehicle direction. That is, if the operator activates a left turn signal, the directional indicator 30 will illuminate and flash to signal and indicate to other vehicles rearward of the operator's vehicle of an intended left turn. The indicators 30 may be illuminated lights, electrically charged filaments or other materials.

Figure 3:
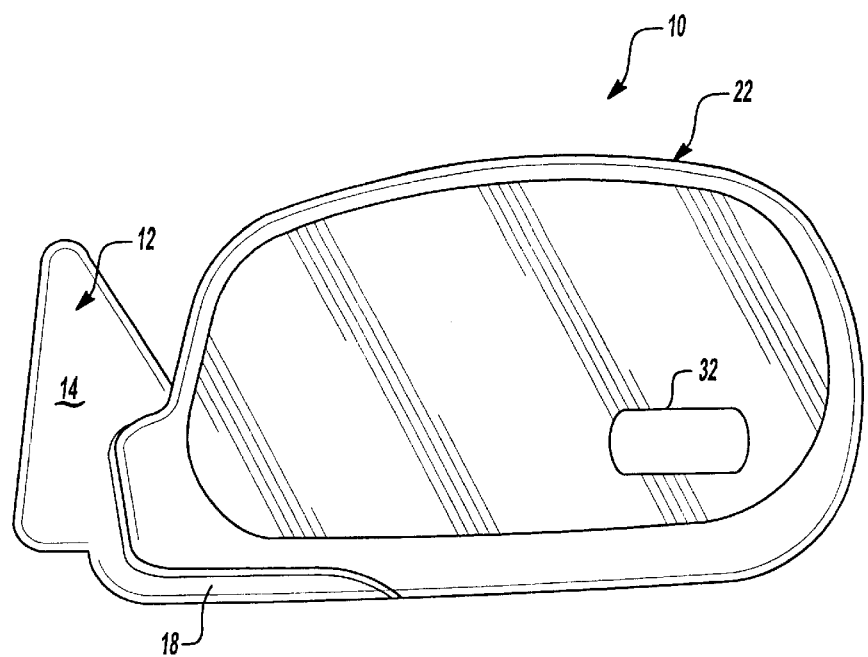
FIG. 3 is a rear view of the mirror assembly in the retracted position.
Figure 4:
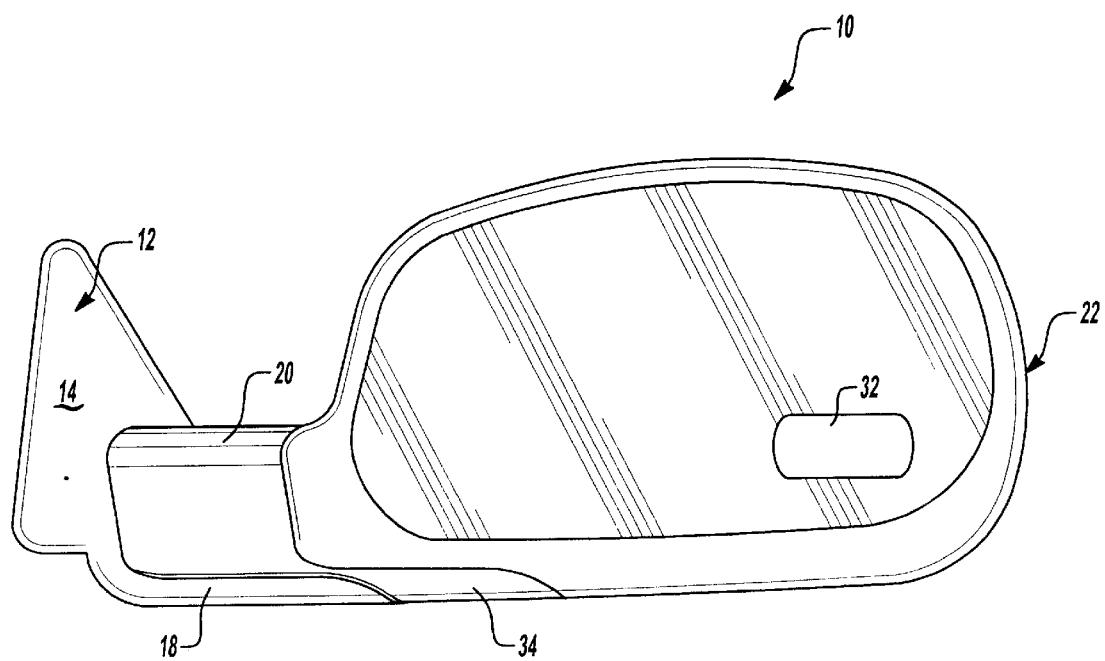
FIG. 4 is a rear view of the mirror assembly in the extended position.

Referring to FIGS. 2 and 4, the mirror assembly 10 is shown in an extended position. Specifically, the mirror housing 22 is slidable along the support arm 20 between a retracted position adjacent the base member 12, as shown in FIGS. 1 and 3, and an extended position spaced from the base member 12, as shown in FIGS. 2 and 4. The mirror assembly 10 is typically used in the retracted position during normal driving conditions and in the extended position when towing a secondary vehicle to provide a wider field of rearward vision. The mirror assembly 10 also includes a pivot mechanism 25 coupled between the first end 21 of the support arm 20 and the base member 12 for providing pivotal movement of the support arm 20 and the housing 22 between a use position projecting generally transverse to the base member 12 and a folded position pivoted generally against the base member 12 and side of the vehicle. Further detailed descriptions and operations of the pivot mechanism 25 and the sliding connection between the housing 22 and support arm 20 are fully set forth in applicant's U.S. Pat. No. 6,213,609 which is incorporated herein by reference in its entirety.

Still referring to FIGS. 2 and 4, the mirror assembly 10 further includes an integrated light assembly shown at 32 secured to the mirror housing 22 opposite the peripheral rim 24 for providing a forward facing lighted illumination from the mirror assembly 10 to alert oncoming occupants of the vehicle. The light assembly 32 may be illuminated in a towing condition of the vehicle, that is, when the vehicle is towing a secondary vehicle to warn oncoming vehicles that the mirrors are extended to a wider operating position and that the vehicle is towing a secondary vehicle which may be a wide load.

Referring to FIG. 3, the mirror assembly 10 additionally includes a puddle lamp 34 mounted to the bottom of the support arm 20. The puddle lamp 34 may include one or more light filaments for projecting light forwardly, downwardly, rearwardly or outwardly to assist the occupant of the vehicle in locating, entering and exiting the vehicle. The puddle lamp 34 may also operate as a rear facing light or as a flashing strobe when the vehicle transmission is shifted into reverse to provide enhanced rear viewing to the vehicle occupant and to warn bystanders located behind the rear of the vehicle. The puddle lamp 34 is covered or concealed with the housing 22 when in the retracted position and exposed for activation and illumination with the housing 22 in the extended position.

Figure 5:
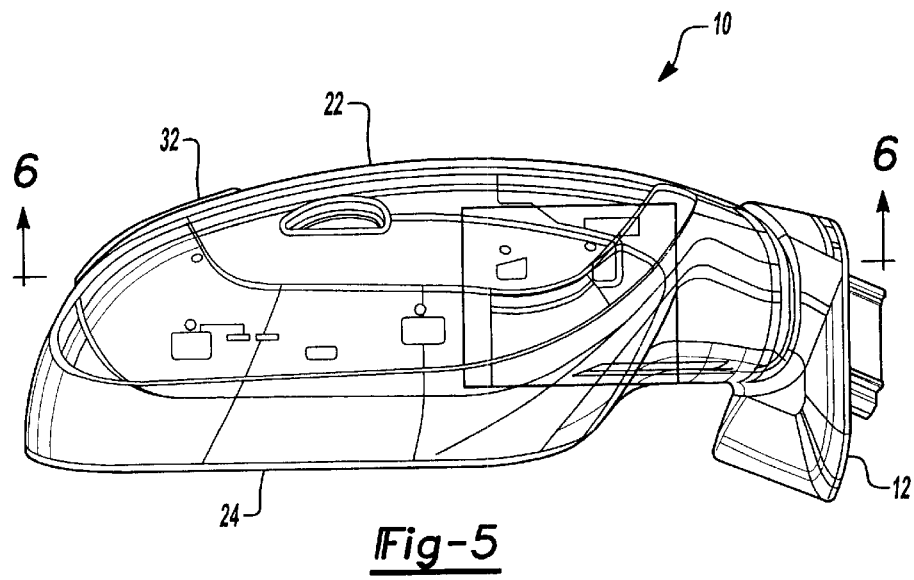
FIG. 5 is a plan view of the mirror assembly in the retracted position.
Figure 6:
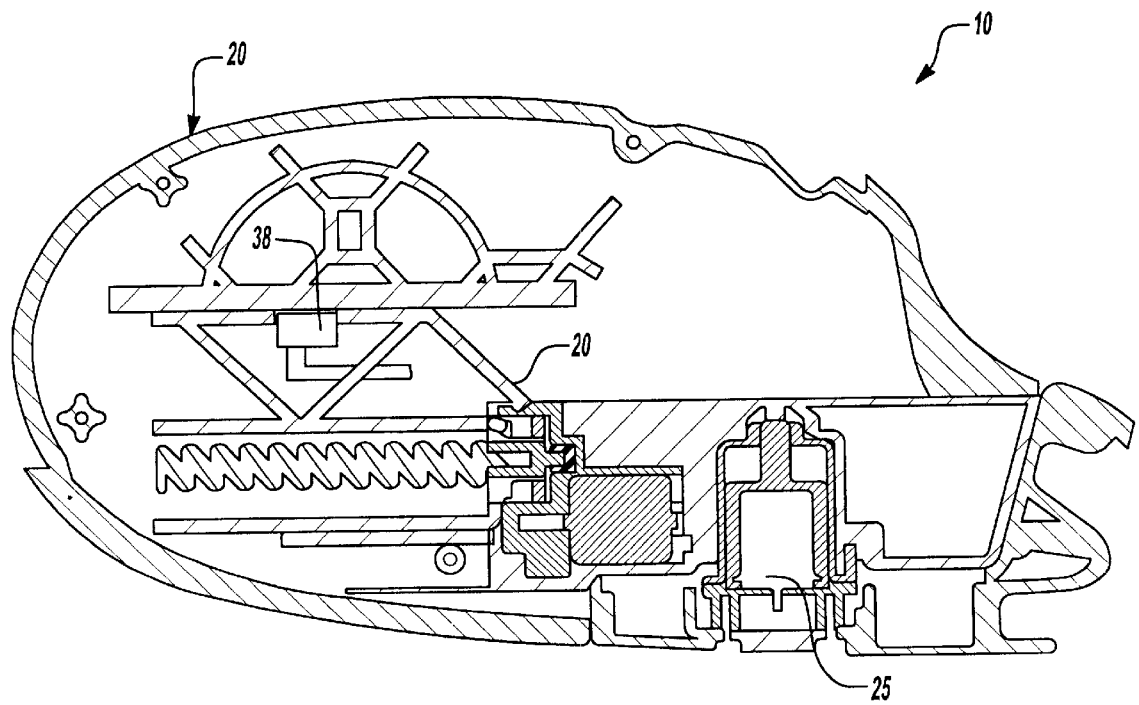
FIG. 6 is a cross-sectional view taken along line 6—6 of FIG. 5.
Figure 7:
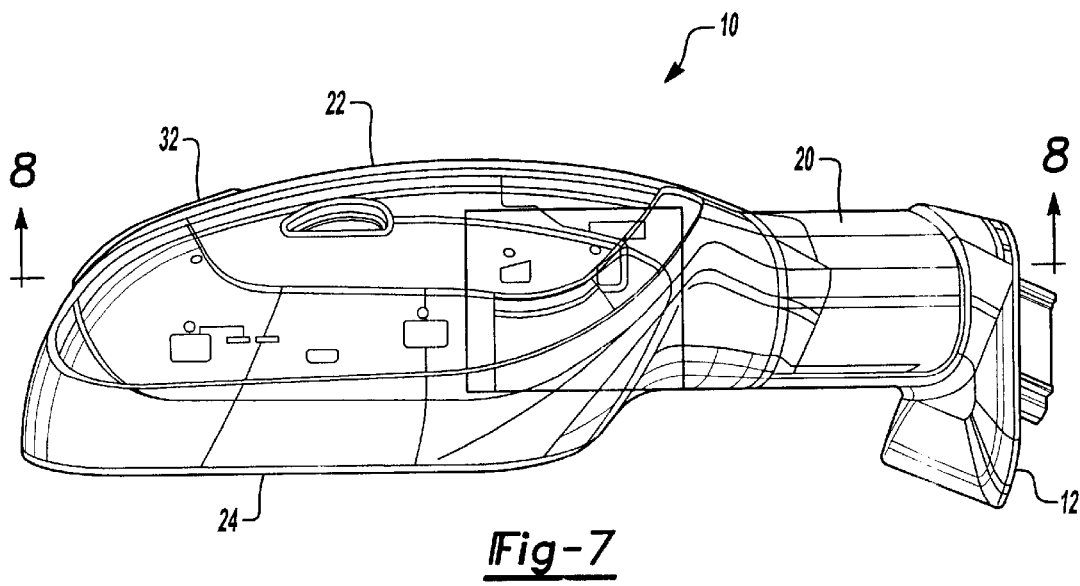
FIG. 7 is a plan view of the mirror assembly in the extended position.
Figure 8:
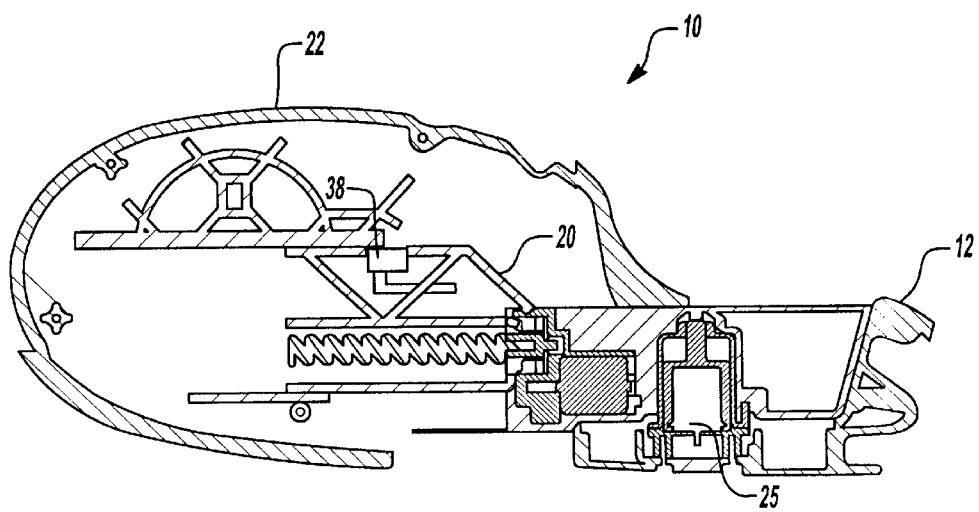
FIG. 8 is a cross-sectional view taken along line 8—8 of FIG. 7.

Referring to FIGS. 5–8, the mirror assembly 10 further includes an activation switch 38 coupled between the support arm 20 and the housing 22 for activating the light assembly 32 in response to the housing 22 being position from the retracted position, shown in FIGS. 5 and 6, to the extended position, shown in FIGS. 7 and 8. The activation switch 38 in the preferred embodiment is an electronic microswitch electrically coupled to the light assembly 32 and actuated by contact between the housing 22 and the support arm 20 during movement of the housing 22 between the retracted and extended positions for activating and illuminating the light assembly 32 in the extended position.

Referring again to FIG. 2, the mirror assembly 10 further includes an information display panel 40 attached to the support arm 20 for viewing by the driver of the vehicle. It should be appreciated that the display panel 40 may be attached to any portion of the mirror assembly 10 so long as it is visible by an occupant within the interior compartment of the vehicle. The support arm 20 includes an inboard side 42 and an outboard side 44 extending between the first and second ends 21,23. The display panel 40 is mounted to the inboard side 42 adjacent to the first end 21. In the embodiment of FIG. 2, the display panel 40 is visible when the mirror 10 is in the extended position, such as when towing a secondary vehicle and is covered or concealed with the housing 22 when the housing 22 is in the retracted position. The display panel 40 may include a color or monochrome screen or form a portion of a secondary mirror pane. By way of example, the vehicle may be equipped with various sensors that transmit operating information to a controller for display on the panel 40 such as outside temperature; tire pressure of the towing or towed vehicle; distance between the vehicle and other objects adjacent to the vehicle; and activation of trailer tracking or other towing information. It should be appreciated that the display panel 40 may transmit and display any desired safety or other information about the vehicle, environmental conditions, towed vehicle, outside object presence and distance therefrom, and the like, when used in the extended or retracted positions.

The invention has been described in an illustrative manner, and it is to be understood that the terminology, which has been used, is intended to be in the nature of words of description rather than of limitation. Many modifications and variations of the present invention are possible in light of the above teachings. It is, therefore, to be understood that within the scope of the appended claims, the invention may be practised other than as specifically described.

What is claimed is:

1. An exterior rearview mirror assembly for use in an automotive vehicle comprising:

a base member adapted to fixedly secure said mirror assembly to the vehicle, an elongate support arm extending from a first end coupled to said base member and a second end spaced from said base member;

a concave mirror housing slidably coupled to said support arm for movement between a retracted position adjacent said base member and an extended position spaced outwardly from said base member; said housing having a peripheral rim defining an opening into said concave housing;

a light assembly mounted to said mirror housing opposite said peripheral rim for providing a forward facing lighted illumination from said mirror assembly to alert oncoming occupants of the vehicle; and an activation switch coupled between said support arm and said housing for activating said light assembly in response to said housing being position from said retracted position to said extended position.

2. An exterior rearview mirror assembly as set forth in claim 1 wherein said activation switch is an electronic microswitch electrically coupled to said light assembly and actuated by movement of said housing between said retracted and extended positions for activating and illuminating said light assembly in said extended position.

3. An exterior rearview mirror assembly as set forth in claim 2 further including a pivot mechanism coupled between said base member and said first end of said support arm for providing pivotal movement of said support arm and said housing between use position projecting generally transverse to said base member and a folded position pivoted generally against the base member and side of the vehicle.

4. An exterior rearview mirror assembly as set forth in claim 3 further including a glass mirror pane seated within said opening and secured to said housing for providing a rearward reflective view to an occupant in the vehicle.

5. An exterior rearview mirror assembly as set forth in claim 4 wherein said mirror pane includes at least one directional indicator light operable in response to the activation of a vehicle directional signal control for providing a rearwardly projecting illuminated signal indicative of the intended vehicle direction.

6. An exterior rearview mirror assembly as set forth in claim 5 further including a puddle lamp assembly mounted to said support arm adjacent said second end for projecting light generally downwardly from said mirror assembly to illuminate the area adjacent the side of the vehicle.

7. An exterior rearview mirror assembly as set forth in claim 6 wherein said puddle lamp assembly is disposed and concealed in said housing when said housing is moved to said retracted position and exposed for illumination when said housing is in said extended position.

* * * * *

UNITED STATES PATENT AND TRADEMARK OFFICE
CERTIFICATE OF CORRECTION

PATENT NO. : 6,497,491 B2  Page 1 of 1
DATED : December 24, 2002
INVENTOR(S) : Boddy et al.

It is certified that error appears in the above-identified patent and that said Letters Patent is hereby corrected as shown below:

Column 1,
Line 22, please delete "mirror" and insert -- mirrors -- therefor.
Line 41, please delete "pedestrian" and insert -- pedstrians -- therefor.
Line 65, please delete "including" and insert -- includes -- therefor.

Column 2,
Line 38, please insert -- mirror -- before "assembly" to read -- mirror assembly --

Column 3,
Line 48, please delete "position" and insert -- positioned -- therefor.

Column 4,
Line 45, please delete "position" and insert -- positioned -- therefor.
Line 57, please insert -- a -- before "use" to read -- a use position --.

Signed and Sealed this

Eleventh Day of March, 2003

JAMES E. ROGAN
*Director of the United States Patent and Trademark Office*